United States Patent [19]

Chiu

[11] 4,219,574
[45] Aug. 26, 1980

[54] FOOD CASING
[75] Inventor: Herman S. Chiu, Chicago, Ill.
[73] Assignee: Union Carbide Corporation, New York, N.Y.
[21] Appl. No.: 882,613
[22] Filed: Feb. 28, 1978
[51] Int. Cl.$^2$ ............................................. A22C 13/00
[52] U.S. Cl. ............................. 426/135; 138/118.1; 426/129; 426/138; 426/140; 426/293
[58] Field of Search ............... 426/105, 135, 140, 129; 138/118.1

[56] References Cited

U.S. PATENT DOCUMENTS

| | | | |
|---|---|---|---|
| 3,818,947 | 6/1974 | Rose | 426/135 X |
| 3,860,728 | 1/1975 | Tanner et al. | 426/140 X |
| 3,898,348 | 8/1975 | Chiu et al. | 426/135 X |

FOREIGN PATENT DOCUMENTS 713510  7/1965  Canada ...................................... 426/135

*Primary Examiner*—Robert L. Lindsay, Jr.
*Attorney, Agent, or Firm*—David Fink

[57] ABSTRACT

A food casing suitable to impart an apparent smoke color to at least a portion of a food product including the food casing, comprises a food casing having interior and exterior surfaces and a coating comprising caramel and an antiblock agent on at least a portion of one of the surfaces.

26 Claims, No Drawings

FOOD CASING

The present invention relates to a food casing, and more particularly to a food casing suitable to impart an apparent smoke color to at least a portion of a food product including the food casing.

Generally, it is known that for certain food products it is desirable to color the food casings and/or the products encased therein in order to increase the consumer appeal. There are many known food approved coloring agents. Caramel is of particular interest with regard to the instant invention. It is known to use commercial caramel as brown coloring for drinks and other consumable products. Most of these caramel materials are in the form of an amorphous dark brown syrup. The acceptance of caramel in the food industry and by consumers tends to make caramel a desirable choice for food products. The article, "Caramel" by R. N. Greenshields and A. W. Macgillivray in *Process Biochemistry*, April 1973, pp. 17 to 20, describes the manufacture, composition, and properties of caramel.

The use of caramel in connection with food casings, however, must be compatible with the usual manufacturing operatings for the casings. For example, the manufacturing of a cellulose food casing, includes the steps of forming the cellulose food casing, winding the casing on a reel in a flattened condition, and, thereafter, inflating the casing with air in order to carry out a subsequent shirring step on the casing.

It has now been found that the presence of a caramel coating on the interior surface of a food casing, particularly in inedible casing such as a cellulosic casing, can produce blocking and interfere with the opening of a flattened casing before the shirring step, or it can result in an uneven separation of the caramel coating between portions of the interior surfaces of the flattened casing when the casing is opened. An uneven coating can result in diminished consumer appeal for the food product.

In addition, an uneven separation of the caramel coating can occur within pleats of a shirred casing stick when the pleats are opened during deshirring of the stick.

For an edible collagen casing, a coating of caramel on the exterior surface may be used but can result in an uneven separation of the caramel coating between adjacent pleats of a shirred casing stick when the stick is being deshirred.

It is known from the U.S. Pat. No. 3,860,728 to Tanner et al to use caramel with a fluid mass of swollen collagen to produce an edible collagen casing. The caramel reacts with the collagen during the heat curing of the casing. The patent indicates that one of the advantages of the use of caramel-containing casing is that the twisted ends of smoked sausages made with the casing self-adhere.

The Canadian Pat. No. 713,510 teaches that a caramel coating can be applied to the interior surface of a shirred cellulose casing stick. The patent does not consider the problems of blocking or an uneven caramel coating. The problem of blocking would not arise for the coated shirred stick and apparently, a uniform coating for the interior surface is not contemplated by the patent because the irregularities of the interior surface of the shirred stick would certainly preclude achieving a uniform coating.

In contrast with the prior art, the present invention in one embodiment provides a uniform caramel coating on the interior surface of an inedible food casing so that there is a transfer of the caramel coating to a food product encased therein and the food product appears to have a uniform smoke coloring after the casing has been removed. In another embodiment for an edible collagen casing, the invention provides a uniform exterior caramel coating which gives an apparent smoke coloring to the food casing.

In accordance with the present invention, a food casing suitable to impart an apparent smoke color to at least a portion of a food product including the food casing, comprises a food casing having interior and exterior surfaces and a coating comprising caramel and an antiblock agent on at least a portion of one of the surfaces.

The food casing to be coated in accordance with the invention can be prepared from regenerated cellulose, cellulose derivatives, alginates, collagen and the like. Fibrous webs may be embedded in the food casings and such casings are commonly termed in the art "fibrous food casings".

The invention can be used in connection with meat products including cooked, smoked, dry and semidry sausages such as frankfurters, bolognas, salamis, cervelats, Thuringers, and the like. The invention can also be used in connection with cheese products.

For inedible food casings, it is preferable to have the coating comprising caramel and antiblock agent on the interior surface of the casing so that the caramel can be transferred to the exterior surface of the food product contained in the food casing. When the inedible food casing is removed prior to consumption of the food, the exterior surface will have an apparent smoke color because of the caramel.

Preferably, the coating is substantially uniform over the entire interior surface of the inedible food casing.

For edible food casings, the instant coating can be on the interior surface of the casing, but it can also be on the exterior surface of the casing because the casing is consumed along with the encased food so that no transfer of the caramel is necessary.

If desirable, both the interior and exterior surfaces of a food casing can have the coatings of the invention. The selection of the surface or surfaces will depend upon the food casing and the desired presentation of the food product to the consumer.

The present invention also relates to the manufacturing of a food casing suitable to impart an apparent smoke color to at least a portion of a food product including the food casing, comprising the steps of forming a food casing, having interior and exterior surfaces, coating at least a portion of one of the surfaces with a caramel and an antiblock agent, thereafter, winding the casing on a reel in a flattened condition, and, subsequently, inflating the casing and carrying out a shirring step.

Preferably, the interior surface is coated for an inedible food casing, but the exterior surface can be coated and then the food casing can be turned inside-out prior to stuffing, if so desired.

The coating can be applied to the interior surface of the food casing by known methods such as by spraying during shirring or, preferably, by slugging, whereas the coating can be applied to the exterior surface of the food casing by spraying, dipping or brushing it on in accordance with conventional practice.

In the practice of the instant invention, it is preferable to combine the antiblocking agent with a caramel solution and to use slug coating of the interior surface of the food casing. For a cellulosic casing, this method is useful when a dry cellulosic casing is used for slug treatment with a squeeze roll setup after which the coated food casing is rewound directly and immediately onto a reel. The U.S. Pat. No. 3,378,379 describes methods of slug coating of a food casing.

It is possible to carry out the invention by first slugging with a caramel solution and then slugging with an antiblocking agent. This is not, however, a preferable embodiment.

If a dry or wet gel cellulosic casing were coated with caramel and thereafter dried in an inflated condition, the blocking problem described herein could be significantly minimized when the caramel coating lost sufficient moisture to become substantially nontacky. Nevertheless, it is possible for the caramel coated casing thereafter to adsorb moisture from the air or during additional processing and thereby to result in a possible serious blocking problem. It is estimated that the critical moisture level for blocking to occur for a food casing having a caramel coating without an antiblocking agent is at least about 17% by weight of total casing.

The term "caramel", as used herein, includes the caramel commercially available for confectionary and other food uses, but it is not limited to this class of materials. The term "caramel", as used herein, includes any carbohydrate containing material which has been caramelized, such as burnt sugar. The caramel solution can also include other substances such as flavoring ingredients.

Suitable antiblocking agents include hydrophobic substances such as mineral oil, silicone oil, vegetable oil and the like. Mineral oil is particularly desirable for this purpose because it is an accepted consumable product.

Mineral oil is also preferable from the point of view of economics and ease of preparation in the form of an emulsion. In addition, surfactant materials including molecules containing hydrophobic chains are also suitable for antiblocking agents. Such antiblock agents include polyoxyethylene (20) sorbitan monooleate sold by Atlas Chemical Ind. Inc. under the trademark TWEEN 80, and dioctyl ester of sodium sulfosuccinic acid sold by American Cyanamid Co. under the trademark AEROSOL OT. These latter two surfactants must be dispersed within the caramel solution before the solution is applied.

The amount of caramel in the coating of the invention depends on the predetermined degree of coloring desired. This determines the concentration of caramel in the solution applied and the amount of the solution deposited on the surface of the casing.

The amount of antiblocking agent in the solution depends on the concentration of caramel in the solution and can be determined easily for the selected antiblock agent.

Generally, for a cellulosic casing a coating of caramel of from about 1 to about 15 milligrams per square inch of caramel solids is satisfactory, and about 5 milligrams per square inch is preferable.

Illustrative, non-limiting examples of the practice of the invention are set out below. Numerous other examples can readily be evolved in the light of the guiding principles and teaching contained herein. The examples given herein are intended merely to illustrate the invention, and are not in any sense to limit the manner in which the invention can be practiced.

EXAMPLES 1 to 9

Examples 1 to 9 were carried out using commercially produced cellulose casings each having a flat width of about 1.30 inches. For each of the examples 1 to 9, solutions having the components shown in Table 1 were used to internally slug coat dry casings with a coating of about 10 milligrams per square inch of solution. Generally, a dry casing for coating has water content of about 10% by weight of total casing. The casing was then inflated and then redried in the conventional manner to a water content of about 10% by weight of total casing.

Table 1

| Example | Caramel grams | Water grams | Propylene glycol grams | Ethyl Alcohol grams | Anti-Block Agent & amt.in grams | Blocking |
|---|---|---|---|---|---|---|
| 1 | 50 | 50 | — | — | — | yes |
| 2 | 90 | — | 10 | — | — | yes |
| 3 | 25 | 20 | — | 10 | — | yes |
| 4 | 50 | 50 | — | — | Tween 80 8 | no |
| 5 | 50 | 50 | — | — | Aerosol OT 6 | no |
| 6 | 50 | 50 | — | — | Silicone Oil (Emulsified) 5 | no |
| 7 | 25 | 20 | — | — | 5% Mineral Oil Emulsion 10 | no |
| 8 | 50 | — | — | — | 5% Mineral Oil Emulsion 50 | no |
| 9 | 25 | 75 | — | — | 5% Mineral Oil Emulsion 10 | no |

The caramel used in the examples 1 to 9 was a commercially available caramel sold by Corn Sweeteners Inc. under the trademark CORN SWEETENER 52A-O. The 5% mineral oil emulsion used herein included 5% by weight mineral oil, 0.15% by weight TWEEN 80, 49.85% by weight propylene glycol, and 45% by weight water.

EXAMPLES 10 to 18

Examples 10 to 18 were similar to the respective examples 1 to 9 except that wet gel casing was used instead of dry casings. The coating solutions applied for the examples 10 to 18 were each about 10 milligrams per square inch. A wet gel casing has a water content of about 60% by weight of total casing. The casings were dried. The casings of the examples 13 to 18 which had coatings including antiblock agents did not exhibit blocking in opening during shirring and maintained a uniform caramel coating during the deshirring.

EXAMPLE 19 and 20

Examples 19 and 20 were carried out using commercially produced large size fibrous casings.

Each of the casings was coated in the dry state by internally slugging with a solution with same as the solution of example 9. The casing of example 19 was stuffed with a bologna emulsion and the casing of the example 20 was stuffed with a ham sausage.

The casings of the examples 19 and 20 did not exhibit any blocking problems upon being opened from a flattened state. In addition, both examples showed a good caramel color transfer from the casings to the meat mass encased therein.

EXAMPLES 21 to 25

Examples 21 to 25 were carried out with edible collagen casings made as follows.

218 lbs. of limed beef hide splits, chopped into approximately ½" to 2" pieces, were subjected to an additional lime treatment with 15 lbs. of lime and 131 gallons of water. The lime treatment was continued for 74 hours with intermittent agitation. After liming, the hide chips were leached with approximately 1.2 gallons per minute of water for 16 hours. The hide chips were then swollen for 9 hours in hydrochloric acid solution maintained at a pH of 1 using a flow rate of dilute acid of 3.2 gallons per minute for one hour and then a flow rate of 2.2 gallons per minute. At the end of the acid swell treatment, the swollen chips were washed with water at 2.5 gallons per minute for about 2 hours until a wash water pH of 2.6 was reached. The chips were drained and chilled to about 1° C. and ground into ⅛" to ½" pieces in a meat grinder. Dry ice was used to reduce the temperature increase during grinding. The temperature during grinding was controlled so as not to exceed about 20° C.

A cellulose fiber dispersion was prepared using the following ingredients:

| | |
|---|---:|
| ground acid-swollen chips | 229 lbs |
| wood cellulose fibers | 191 lbs |
| water | 1760 lbs |
| ice | 1000 lbs |
| Hydrochloric acid, 20°Baume | 1 lb |

The wood cellulose fibers used had an average fiber length of about 0.04". Sheets of fibers were separated into convenient pieces, soaked in a portion of the water for about 60 minutes, mixed for about two minutes, soaked for an additional 30 minutes, and then mixed for about 2 minutes. The rest of the ingredients were added to the mixer and the mixture was blended for about 165 minutes. The resulting wood cellulose fiber suspension was smooth, highly viscous, free of fiber clumps and had a composition of hide solids 1%, wood cellulose fibers 5.6%, and water 93.4%.

A collagen composition having a total solids of 11.1% was prepared having a ground hide solids of 9.4% and a wood cellulose fiber solids of 1.7%.

The collagen composition was prepared by weighing 83.5 pounds of 16.7% solids ground acid-swollen chips, 46 pounds of cellulose fiber dispersion and 24 pounds of water.

Blending of the ground acid-swollen chips and cellulose fiber dispersion was conducted as described below.

The ingredients were mixed in two steps. In the first step the water required to adjust final collagen composition solids to 11.1% was added to the ground acid-swollen chips and mixed for two minutes. In the second mixing step, the cellulose fiber dispersion was added. After mixing for about five minutes, the composition was homogeneous and began to adhere to the mixing equipment. The temperature of the various materials during the two mixing steps was controlled so as not to exceed 20° C.

After preparing the collagen composition, the composition was fed through a rotary-shear homogenizer by means of a screw extruder and pump. To prevent degradation of the collagen, the homogenizer rotor and stator were cooled with a collant maintained at a temperature of about −5° C.

After homogenization, the blend was pumped through two parallel filters with 0.003" slots to break up any remaining collagen lumps and remove any nondispersed matter.

The filtered collagen blends were pumped and metered through an extrusion nozzle to form a continuous tubular casing of collagen. The extruded tubes were inflated with low-pressure inflation air while being conveyed on horizontal rolls.

The inflated collagen tubing was partially dried and hardened by being passed through a predryer at 50° C., collapsed between nip rolls, neutralized by passing through a dip tank containing 0.06 N ammonium hydroxide, washed by being conveyed through water tanks and then plasticized by being conveyed through a dilute glycerol solution.

Each collapsed collagen casing was conveyed to a container of glycerol solution having a pH of 7 to 9. The solution comprised glycerol in an amount sufficient to maintain the glycerol in the casing so there was no loss or gain in the glycerol content of the casing, and it contained 0.7%, 7.5%, 10%, 15% and 30% by weight of Union 30B-O caramel color for the respective examples 21 to 25. Union 30B-O is a trademark of Corn Sweeteners Inc. identifying a positively charged Bakers and Confectioners caramel color derived from glucose. The solutions for the examples 22 to 25 further included the antiblock agent of 5% mineral oil emulsion with the weight ratio of caramel to antiblock agent being 25:1. The casings were treated with this solution for 3 seconds. The excess solution was wiped from the surface of the collapsed collagen casings.

The casings were then reinflated with low pressure air, dried in air at 100° C., moisturized in an equalizer at 70% RH and then shirred by passing through a shirring apparatus. The coating on the surface of the casings was as shown in Table 2.

Table 2

| Example | % by weight Caramel Solution Concentration | Caramel Coating (Milligrams Caramel Solids Per 100 Square Centimeters Of Casing Surface) |
|---|---|---|
| 21 | 0 | 0 |
| 22 | 7.5 | 5 |
| 23 | 10 | 7 |
| 24 | 15 | 10 |
| 25 | 30 | 20 |

Because the caramel color was added to the casing after extrusion and dip bath processing, addition of caramel color required no alteration to wet processing conditions up to the point of caramel addition.

Each finished casing was colored a yellow-brown color. The yellow-brown color was not observed to fade in the casing during processing or during storage of the casing after processing. The strength of the caramel-coated casing was in every way comparable to that of casing having no caramel coating.

When stuffed with fresh pork sausage emulsion, the caramel coating gave a smoked appearance to the sausage, although the color was somewhat more yellow than a naturally smoked sausage.

The casing with no caramel applied to its surface did not have a smoked appearance. There was no narrow line on the finished sausage associated with the former edge fold of the casing in its collapsed state prior to drying. During subsequent storage of the sausages, the brown color remained with the sausage casing and did not migrate to the sausage emulsion.

EXAMPLES 26 to 28

Examples 26 to 28 were carried out with edible collagen casings similar to the examples 21 to 25, but the effect of longer treatment with the caramel was determined. The longer contact time with the caramel was obtained by adding the caramel and antiblocking agent to the glycerol solution used to plasticize the casing.

Using the procedure of the examples 21 to 25, ground acid-swollen chips were prepared from 125 lbs. of limed beef hide splits that were subjected to an additional lime treatment with 9 pounds of lime. These ground acid-swollen chips were used in example 26.

Also using the procedure of the examples 21 to 25, ground acid swollen chips were prepared from 1771 pounds of limed beef hide splits that were subjected to an additional lime treatment with 150 pounds of lime. These ground acid-swollen chips were used in the examples 27 and 28.

The procedure of the examples 21 to 25 was used in preparing a cellulose fiber dispersion with the following proportion of ingredients:

| | |
|---|---|
| Ground acid-swollen hide | 229 lbs. |
| Wood cellulose fibers | 191 lbs. |
| Water | 1861 lbs. |
| Ice | 900 lbs. |
| Concentrated hydrochloric acid 20° Baume | 1 lb. |

Using the procedure described in the examples 21 to 25, collagen compositions were prepared having the following solids composition:

| Example | Percent of Total Solids As: | |
|---|---|---|
| | Ground acid-swollen chips | Wood cellulose fibers |
| 26 | 85 | 15 |
| 27 | 80 | 20 |
| 28 | 80 | 20 |

The collagen compositions were prepared by weighing the following proportion of ingredients:

| Example | Ground acid-Swollen chips 14.8% solids (lb) | Cellulose Fiber Dispersion (lb) | Water (lb) |
|---|---|---|---|
| 26 | 73 | 35.4 | 9.3 |
| 27 | 104 | 72 | 5.9 |
| 28 | 104 | 72 | 5.9 |

Collagen casings for the examples 26 to 28 were prepared from each of the collagen compositions with the procedure described in the examples 21 to 25, except that the final, short dip in glycerol-caramel-antiblock solution was omitted. The respective collagen casings were treated in glycerol dip baths containing respectively 0.0%, 0.54% and 1.08% by weight caramel with 5% mineral oil emulsion in a 2.5:1 ratio as in the examples 22 to 25.

A commercially available Bakers and Confectioners caramel color (Corn Sweeteners 30B-O) was the caramel color used in the examples 27 and 28.

The finished casings of the examples 27 and 28 were colored a yellow-brown. The color did not fade during processing or during storage of the casins after processing.

The caramel coatings on the casings were as follows:

| Example | By Weight Caramel Solution Concentration (% As Is Caramel) | Carmel Coating (Milligrams Caramel Solids Per 100 Square Centimeters Of Casing Surface) |
|---|---|---|
| 26 | 0 | 0 |
| 27 | 0.54 | 6 |
| 28 | 1.08 | 12 |

When stuffed with fresh pork sausage emulsion, the caramel coatings of the casings of the examples 27 and 28 gave a smoked appearance to the sausages, although the color was somewhat more yellow than that of a commercially smoked sausage.

The casing of example 26, with no caramel applied to its surface, when stuffed with fresh pork sausage emulsion, did not produce sausages with smoked appearance.

During subsequent storage of the sausages, the brown color remained with the sausage casings of the examples 27 and 28 and did not migrate to the respective sausage emulsion.

The strength characteristics of the finished casings of the examples 27 and 28 were found to be comparable to those of the casing of the example 26.

It is to be understood that there is no desire to be limited to the exact details shown and described, for obvious modifications will occur to a person skilled in the art.

Having thus described the invention, what is claimed as new is as follows:

1. A food casing suitable to impart an apparent smoke color to at least a portion of a food product, comprising a food casing having interior and exterior surfaces and a coating consisting essentially of caramel and an antiblock agent on at least a portion of one of said surfaces; said antiblock agent being selected from the group consisting of mineral oil, silicone oil, vegetable oil, polyoxyethylene (20) sorbitan monooleate, and dioctyl ester of sodium sulfosuccinic acid.

2. The food casing of claim 1, wherein said food casing is an inedible casing.

3. The food casing of claim 2, wherein said food casing is a cellulosic casing.

4. The food casing of claim 3, wherein said cellulosic casing includes a fibrous web embedded in its wall.

5. The food casing of claim 2, wherein said food casing is an inedible collagen casing.

6. The food casing of claim 1, wherein said food casing is an edible collagen casing.

7. The food casing of claim 1, wherein said coating is on said interior surface.

8. The food casing of claim 1, wherein said coating is on said exterior surface.

9. The food casing of claim 1, wherein said coating comprises from about 1 to about 15 milligrams of caramel solids per square inch of casing surface.

10. The food casing of claim 9, wherein said coating comprises about 5 milligrams of caramel solids per square inch of casing surface.

11. A method of manufacturing a food casing suitable to impart an apparent smoke color to at least a portion of a food product, comprising the steps of forming a food casing having interior and exterior surfaces, and coating at least a portion of at least one of said surfaces with a coating consisting essentially of caramel and an antiblock agent; said antiblock agent being selected from the group consisting of mineral oil, silicone oil, vegetable oil, polyoxyethylene (20) sorbitan monooleate, and dioctyl ester of sodium sulfosuccinic acid.

12. The method as claimed in claim 11, wherein said coating is applied by spraying said one surface.

13. The method as claimed in claim 11, wherein said coating is applied by dipping said food casing.

14. The method as claimed in claim 11, wherein said coating is applied by brushing said one surface.

15. The method as claimed in claim 11, wherein said coating is applied by internally slugging said food casing.

16. The method as claimed in claim 11, wherein said food casing is an inedible casing.

17. The method as claimed in claim 11, wherein said food casing is a cellulosic casing.

18. The method as claimed in claim 17, wherein said cellulosic casing includes a fibrous web embedded in its wall.

19. The method as claimed in claim 16, wherein said food casing is an inedible collagen casing.

20. The method as claimed in claim 11, wherein said food casing is an edible collagen casing.

21. The method as claimed in claim 11, wherein said coating is on said interior surface.

22. The method as claimed in claim 11, wherein said coating is on said exterior surface.

23. The method as claimed in claim 11, wherein said coating comprises from about 1 to about 15 milligrams of caramel solids per square inch of casing surface.

24. The method as claimed in claim 11, wherein said coating comprises about 5 milligrams of caramel solids per square inch of casing surface.

25. The method as claimed in claim 11, further comprising the steps of winding said casing on a reel in a flattened condition, and, thereafter, inflating said casing.

26. The method as claimed in claim 25, further including the step of shirring said inflated casing.

* * * * *